Jan. 16, 1934.  G. W. BRINGMAN  1,943,417
ATTACHMENT FOR AQUARIUM TANKS
Filed Sept. 3, 1932   3 Sheets-Sheet 1
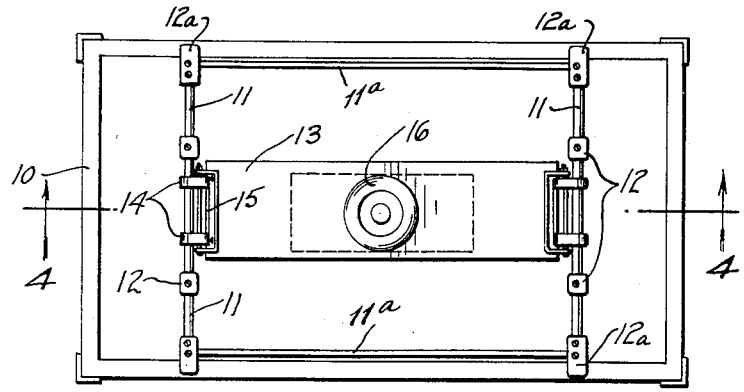
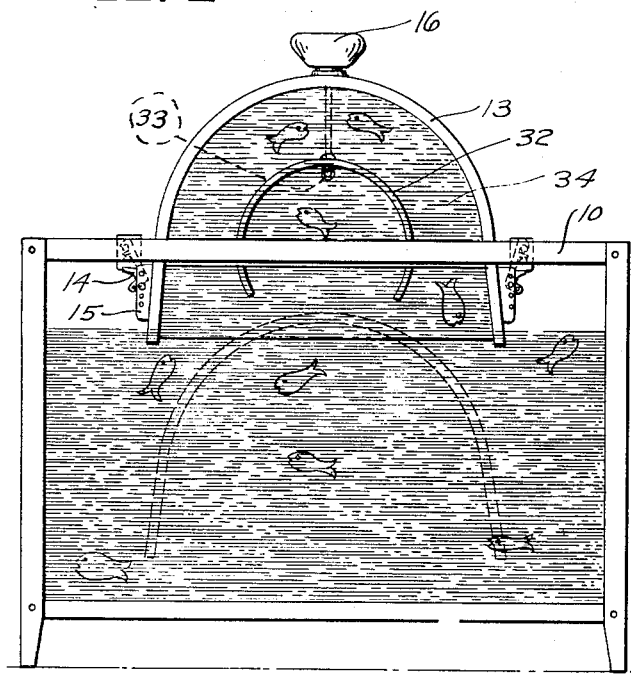
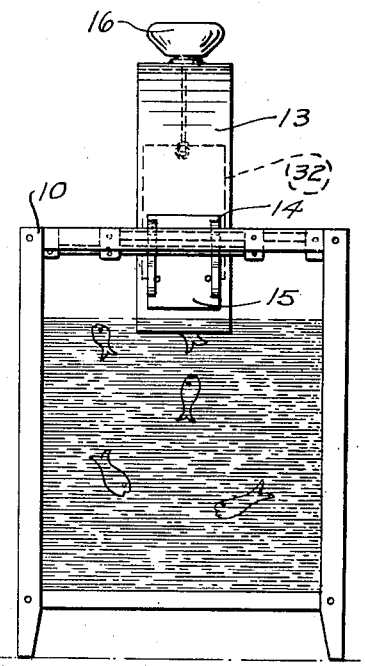
INVENTOR
GEORGE W. BRINGMAN
BY
ATTORNEY Jan. 16, 1934.                G. W. BRINGMAN                1,943,417
                        ATTACHMENT FOR AQUARIUM TANKS
                    Filed Sept. 3, 1932        3 Sheets-Sheet 2
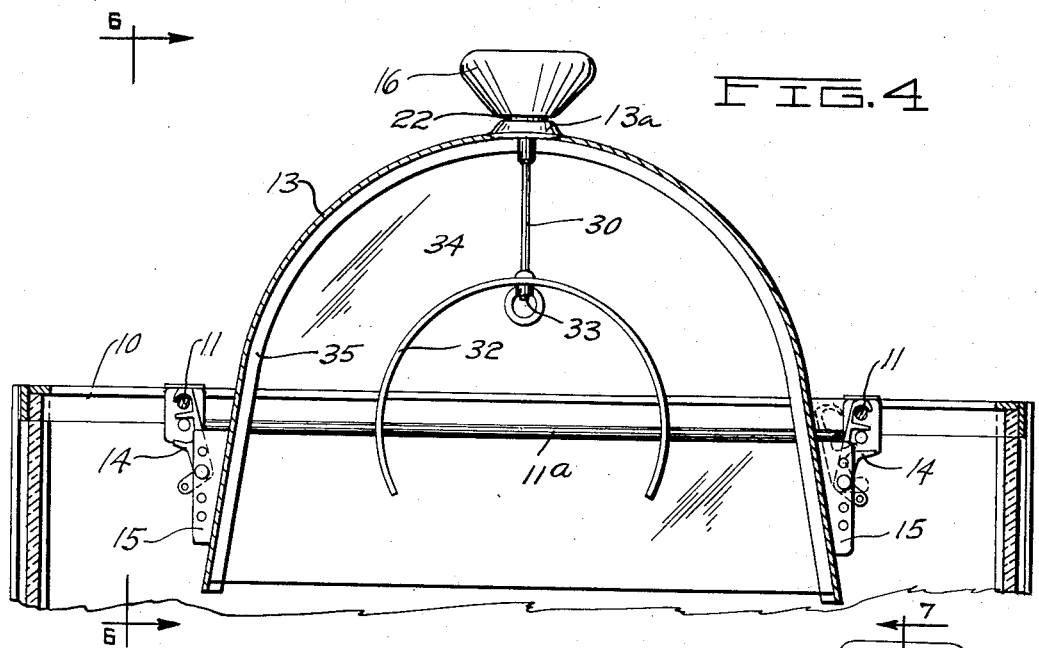
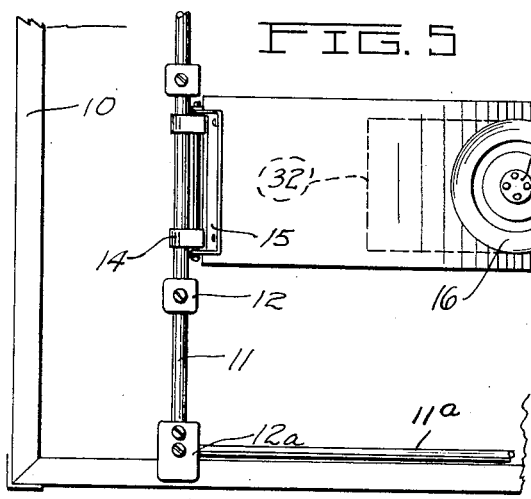
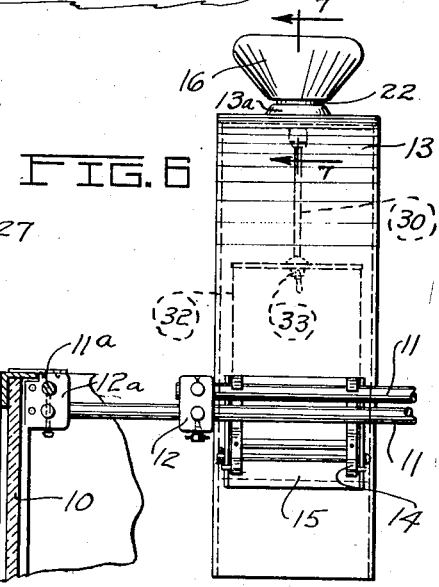
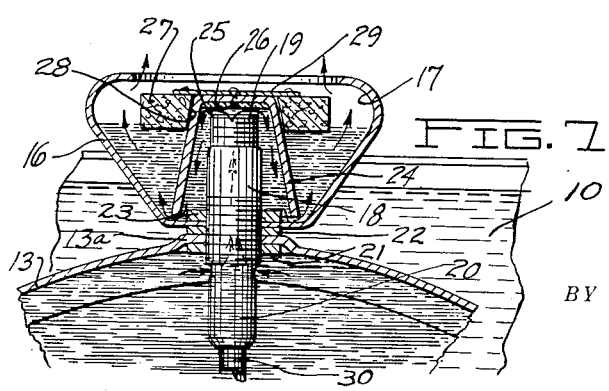
INVENTOR
GEORGE W. BRINGMAN
BY
ATTORNEY Jan. 16, 1934.  G. W. BRINGMAN  1,943,417
ATTACHMENT FOR AQUARIUM TANKS
Filed Sept. 3, 1932  3 Sheets-Sheet 3
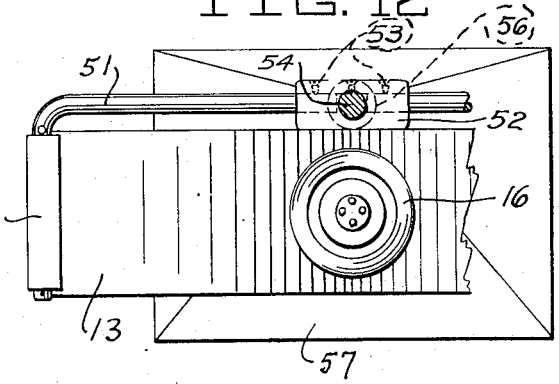
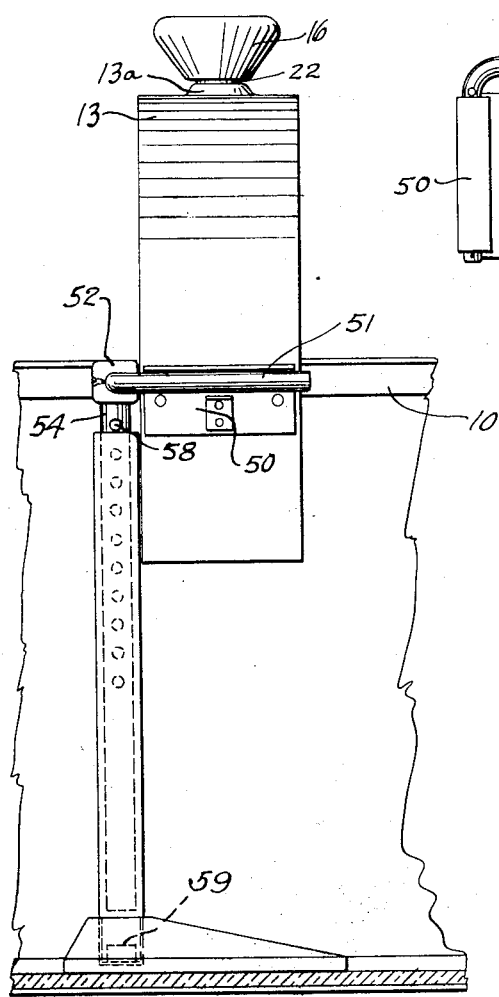
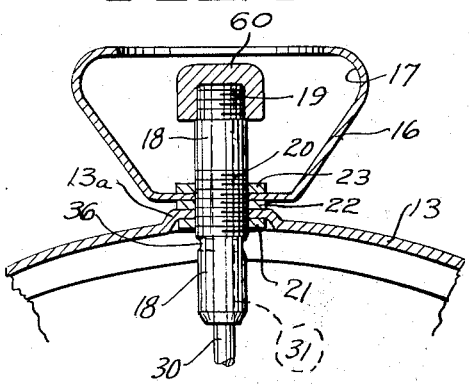
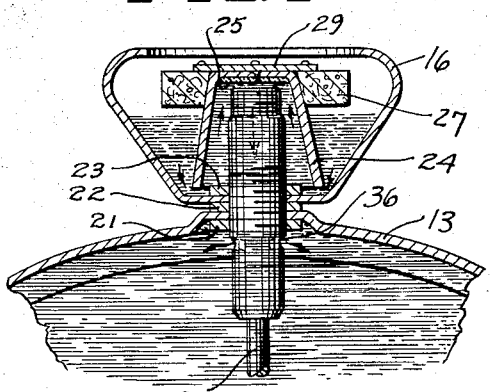
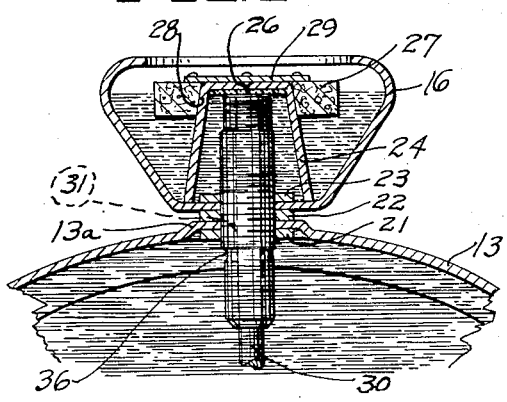
INVENTOR
GEORGE W. BRINGMAN
BY John A. Bommhardt
ATTORNEY Patented Jan. 16, 1934

1,943,417

UNITED STATES PATENT OFFICE 1,943,417

ATTACHMENT FOR AQUARIUM TANKS

George W. Bringman, Cleveland, Ohio

Application September 3, 1932. Serial No. 631,643

4 Claims. (Cl. 119—5)

My invention relates to improvements in aquariums and in particular to a novel means for providing a self filling waterway arch for fish.

One of the objects of the invention is to provide a means whereby the fish may swim above the ordinary water level of an aquarium or pool.

Another object is to provide a water-filled arch that is self-filling.

Other objects and advantages may be noted from the following specifications and accompanying drawings, in which:

Figure 1 is a plan view of the invention attached to an aquarium for use with either quiet water or continuous flow of water; Fig. 2 is a side elevation of the aquarium with the arch elevated and filled with water; Fig. 3 is an end elevation of Fig. 2; Fig. 4 is an enlarged longitudinal section of the arch and adjusting bracket and upper part of the aquarium taken on line 4—4 of Fig. 1; Fig. 5 is a fragmentary plan view of part of the arch and adjusting brackets; Fig. 6 is an end elevation of the arch and adjusting brackets taken on line 6—6 of Fig. 4; Fig. 7 is an enlarged sectional view on line 7—7 of Fig. 6 showing the first position with the knob valve open and the air flowing out the top, drawing the water into the knob through valve by suction; Fig. 8 is a section similar to Fig. 7 but in the second position with the knob valve closed and the water at the high level; Fig. 9 is similar to Figs. 7 and 8 but in the third position with the knob valve open and the water receding into the aquarium; Fig. 10 is a section similar to Figs. 7, 8 and 9, but with a screw cap replacing the valve; Fig. 11 is a fragmentary end view of an aquarium with a modified device for quiet flow of water; and Fig. 12 is a fragmentary plan view of Fig. 11.

Referring specifically to the drawings, an aquarium tank is indicated at 10, and a plurality of adjustable rods 11 mounted through blocks 12 are drawn out to the desired length to span the top of the aquarium tank, the blocks 12a resting on the edges of the tank support the hollow arch 13 by catches or hangers 14 attached to brackets 15 mounted on each end of the arch, and cross bars 11a through blocks 12a prevent any side slipping of the blocks 12a.

A knob 16 is mounted at the apex of arch 13 and is hollowed at 17, and screwed through the collar 13a of arch 13 is a tube 18 threaded at 19 and 20. A lock nut 21 is screwed on said threaded end 20 within the collar 13a with a second lock nut 22 superimposed over the collar 13a and screwed on the upper part of threaded end 20 of the tube 18. Knob 16 is screwed on said tube above lock nut 22 and held rigidly in position by a third lock nut 23. A cone or inverted cup shaped valve 24 fits over the top of the tube and has a resilient washer 25 held within the valve and attached by means of a screw 26. A cork 27 has a tapered aperture 28 through its center superimposed over which is a plate 29 riveted or attached to said cork 27 by any suitable means. The cork 27 and plate 29 are mounted upon the valve 24 and act as a float within the knob 16.

A rod 30 is screwed within the tube 18 which has a bore 31 through its entire length, and attached to the lower end of said rod is a lower curved metal baffle 32 held in position by a ring nut 33 screwed over the end of rod 30 which projects through the baffle 32 which causes the fish to swim up and around within the arch where they can be readily seen.

Glass sides 34 are inserted within the flanged sides 35 of the arch 13 and held in place by the peened edge of said flange.

In operation the valve 24 is placed over the top of tube 18, and the arch 13 is slowly lowered into the tank which causes the air inside the arch 13 to escape through the hollow knob 16 as shown in Fig. 7, and water from the tank then presses in through the apertures 36 in the tube 18 and into said tube, the water following the air through the clearance between the top of tube 18 and the valve 24 falls downward within the said valve and escapes into the hollow knob 16. The water rising causes the float to move upward and when the arch is raised the float will lower and close the valve and stop the flow within the knob as shown in Fig. 8.

The arch is raised until the rods 11 are engaged by the lugs or hangers 14 to support the arch in raised position. The valve 24 should not be disturbed after the arch 13 is once filled unless it is necessary to drain the said arch when the valve 24 is raised and the water retreats through the valve and back through the bore 31 in tube 18 and out through apertures 36 in the lower part of tube 18 and down into the tank.

Water may be added by pouring same into the knob 16 or by placing a hose or pipe line within the knob.

When the arch 13 is being lowered into the water the valve 24 rises just enough to allow the air to escape and fill the arch with water and when full and the arch has been raised so that the top of the tube 18 is at or above the level of the water in the aquarium the resilient washer 25 within the valve 24 presses on the top of tube 18 and closes the valve. When fresh water is added, the float rising causes the valve to open and a portion of water enters the arch 13, the knob draining causes the float to drop and again closes the connection until the water again rises in knob 16.

If only quiet water is used a modified form may be used in which brackets 50 (Fig. 11) are attached at each side of arch 13 through which bent arms 51 are mounted and held within each end of block 52 by set screws 53. A shaft 54 extends upwardly through said block 52 with a plurality of apertures 55 through said shaft at intervals. Shaft 54 is raised or lowered within a hollow glass tube 56 mounted upon base 57, the shaft 54 being retained at any desired height by a pin 58 being thrust through any of the apertures 55, said pin 58 resting across the top of glass tube 56. A resilient plug 59 is inserted in the base of the said glass tube for drainage purposes. In the form shown in Fig. 10 a cap 60 is screwed on the tube 18, instead of the valve, and may be removed to let in air to empty the arch.

This system may be used in any pool.

The principle of operation is the same for both systems and being heretofore described it will not be necessary to repeat it.

The provision of an arch filled with water above the water in the tank, permits the fish to swim up within the arch, with a pleasing appearance or results, and the valve structure described enables the arch to be quickly and easily filled without removing the same from the tank.

I claim:—

1. An attachment for aquarium tanks, comprising a hollow arch having a transparent wall, and movable up and down in the tank, a valve in the top of the arch, to permit the escape of air when the arch is lowered into the tank, and acting to close when the arch is raised, and means to support the arch in raised position.

2. An attachment as in claim 1, and a hollow knob attached to the arch and enclosing the valve and communicating with the interior of the arch, said knob having an opening for the escape of air from the arch and the supply of water to the arch.

3. An attachment for aquarium tanks, comprising a hollow arch, devices to support the same upon the tank with its lower edge in the water in the tank, and an air escape valve in the top of the arch arranged to open when the arch is lowered in the tank.

4. An attachment for aquarium tanks, comprising a hollow arch, devices to support the same upon the tank with its lower edge in the water in the tank, an air escape valve in the top of the arch, a hollow knob enclosing said valve, and a float in the knob, controlling the valve.

GEORGE W. BRINGMAN.